United States Patent [19]
Levin

[11] Patent Number: 6,144,007
[45] Date of Patent: Nov. 7, 2000

[54] METHOD AND APPARATUS FOR FORMING A PERFORATED NON-PLANAR OBJECT USING A PULSED ENERGY BEAM

[76] Inventor: Theodore L. Levin, 127 S. Vinewood St., Escondido, Calif. 92029

[21] Appl. No.: 09/178,624

[22] Filed: Oct. 26, 1998

[51] Int. Cl.$^7$ .................................................. B23K 26/04
[52] U.S. Cl. .............................. 219/121.62; 219/121.62; 219/121.7
[58] Field of Search ...................... 219/121.62, 121.61, 219/121.7, 121.71, 121.82, 121.83, 121.85

[56] References Cited

U.S. PATENT DOCUMENTS

| | | | |
|---|---|---|---|
| 5,293,025 | 3/1994 | Wang | 219/121.71 |
| 5,294,567 | 3/1994 | Dorfman et al. | 437/187 |
| 5,466,908 | 11/1995 | Hosoya et al. | 217/121.68 |
| 5,585,019 | 12/1996 | Gu et al. | 219/121.73 |

*Primary Examiner*—Patrick Ryan
*Assistant Examiner*—M. Alexandra Elve
*Attorney, Agent, or Firm*—Lyon & Lyon LLP

[57] ABSTRACT

A method and apparatus for forming a perforated non-planar object by use of a pulsed energy beam in which the relative position of the object to the pulsed energy beam is determined and the pulsed energy beam is then fired at the object to form a hole based upon the relative position of the object to the pulsed energy beam in accordance with a present hole pattern. The relative position of the object to the pulsed energy beam is then changed, and the determination and firing process is repeated a plurality of times to form a perforated object with a preset hole pattern.

12 Claims, 3 Drawing Sheets

METHOD AND APPARATUS FOR FORMING A PERFORATED NON-PLANAR OBJECT USING A PULSED ENERGY BEAM

FIELD OF THE INVENTION

The field of the invention includes methods and apparatus or forming perforations or holes in non-planar objects using a pulsed energy beam of radiation.

BACKGROUND OF THE INVENTION

In many operation processes involving the use of fluids, there often exits a need to pass fluid though a sieve or filter to remove one or more components from a fluid. In addition to removing unwanted components of a fluid, these sieves or filters can also be used to control the rate of fluid flow through a defined space. In many operations, however, conventional filters and sieves are impracticable to use. To this end, fine screens and the like are often utilized as a filter or as a flow regulator. Often, due to the particular requirements of the process, very minute holes are needed to create a filter or flow restriction device. These holes can be extremely small, requiring densities of tens of thousands of holes per square inch.

For example, in satellite fuel systems, components contained within the satellite fuel system may need to be filtered out to create the desired fuel mixture. As the filtering or screening process takes place on the molecular level, the tolerances and accuracy of the hole placement are of critical importance. In this situation, overlap between adjacent holes can cause the total failure of a component because molecules with a diameter greater than a single hole can pass through the enlarged hole of the sieve or filter.

Typically, these devices are made by forming the desired pattern of perforations or holes in a flat or planar sheet of material. This is usually done using a pulsed laser or electron beam. The perforated material is then formed into the desired shape, i.e., a cylinder, and then welded together. Unfortunately, this method suffers from a number of limitations. Initially, the perforated area is not continuous over the entire body of the object because a portion of the surface is taken up by the weld joint. Related to this problem is the fact that the welding process often damages or creates unwanted stress in the perforated component. In addition, since the formed object is initially formed as a flattened sheet, this limits the advantage of increasing the structural strength by employing reinforced bands, ribs, end caps or the like.

Alternatively, instead of creating non-planar components from a linear sheet of material, a component of pre-formed geometry can be machined from solid stock, spun form, or the like, to create a non-planar component without any welds. The non-planar component can then be perforated by the use of a laser or electron beam to create a plurality of holes in the surface of the component. Unfortunately, heretofore, the process of perforating a non-planar object has suffered from a number of limitations.

One particular problem concerns the accuracy of placing the individual holes in the desired location on the component. Often, as a result of the formation process, the holes are located in unintended positions on the non-planar object. This can result in the deleterious overlap of adjacent holes in the object, thereby creating holes that are larger than desired. In addition, when holes are placed too close to one another on the exterior of the object, the web portion residing between adjacent holes is weakened and can lead to structural failure of the component. Moreover, heretofore, it has been economically prohibitive and time consuming to accurately produce high-density holes on non-planar objects. This problem is even a greater concern when high-density configurations are needed that require intricate patterns on the surface of the object. For example, some jobs require that the hole pattern alternate among adjacent rows of holes on the surface of the object. This pattern of perforations is particularly hard to create using traditional techniques.

One approach that has been tried is to move the work piece or the laser head to a pre-determined position, and after motion has stopped, a burst of laser energy is fired to create the hole. The disadvantage of this approach, however, is that a significant amount of time is lost in the starting and stopping motion of either the laser head or the work piece. Using this technique, drill rates exceeding four holes/second can be problematic. Another approach that has been used is to fire the laser at a predetermined pulse rate and move the laser or the object at a predetermined speed. This technique is known as "firing on the fly." The disadvantage of this method is that the exact position of the holes cannot be accurately maintained do to the variances in the laser pulse rate or minor fluctuations in motion of the material and/or the laser head. Variations in the velocity of the work piece and laser head create irregular hole placement on the object. This problem is particularly acute during acceleration and deceleration of the laser head or work piece.

Consequently, there remains a need for a method of accurately perforating a non-planar object using a pulsed beam of radiation. The method would provide for accurate placement of a plurality of holes on a non-planar object. The method would allow operators to make high-density patterns on a multitude of shaped objects without resulting in any hole overlap.

SUMMARY OF THE INVENTION

In a first aspect of the present invention, an improved method of forming a perforated non-planar object by use of a pulsed energy beam is provided. The movement of the object relative to an energy beam emitter is controlled by a CNC system. The method comprises the steps of first determining the relative position of the object to the pulsed energy beam and then firing the pulsed energy beam at the object to form a hole based upon the relative position of the object to the pulsed energy beam in accordance with a preset hole pattern. The relative position of the object to the pulsed energy beam is then altered by either moving the energy beam, the object, or both. The above-recited steps are repeated a plurality of times to form a perforated object with a plurality of holes according to the preset hole pattern.

In a second, separate aspect of the present invention, an apparatus for forming a plurality of perforations in a non-planar object is disclosed. The apparatus includes an energy beam emitter that emits a beam of energy therefrom, an object holder for holding the object, a movement mechanism for moving the position of the object holder relative to the energy beam emitter, a feedback sensor that determines the relative position of the object relative to the energy beam emitter and an energy beam controller. The energy beam controller causes the energy beam emitter to emit a plurality of pulses of energy to form a plurality of perforations in the object according to the preset hole pattern based upon feedback received from the feedback sensor regarding the relative position of the object relative to the energy beam emitter.

In still another, separate aspect of the present invention, a method and apparatus for forming a plurality of perforations in a non-planar object is disclosed which allows superior results to be obtained at previously unheard of rates of time. For example, a non-planar object can be formed with a hole density of at least 10,000 holes/in$^2$ while the energy beam pulses at a rate of at least 10 holes/sec. Furthermore, the hole density can be increased to at least 20,000 holes/in$^2$ or even 30,000 holes/in$^2$ or more, whereas the rate of energy beam pulses can be increased to at least 50 holes/second, or even up to over 100 holes/second.

In still further, separate aspects of the present invention, two feedback sensors can be used for determining the exact position of the object relative to the energy beam emitter. The first feedback sensor determines the position of the energy beam emitter and a second feedback sensor determines the position of the non-planar object so that the position of the energy beam emitter relative to the object is obtained. Also, the results of the two sensors can be combined with an established set of criteria to control the firing of the energy beam emitter. Moreover, the energy beam emitter can be fired at a non-uniform time interval.

Accordingly, it is an object of the present invention to provide a method and apparatus for perforating a non-planar object using a pulsed beam of radiation. The invention allows high-density perforations to be made accurately and quickly. The method and apparatus can be used on any non-planar object and can be used to create any number of pre-determined patterns. Other and further objects and advantages will appear hereafter.

DETAILED DESCRIPTION OF THE PREFERRED EMBODIMENT

Figure 1:
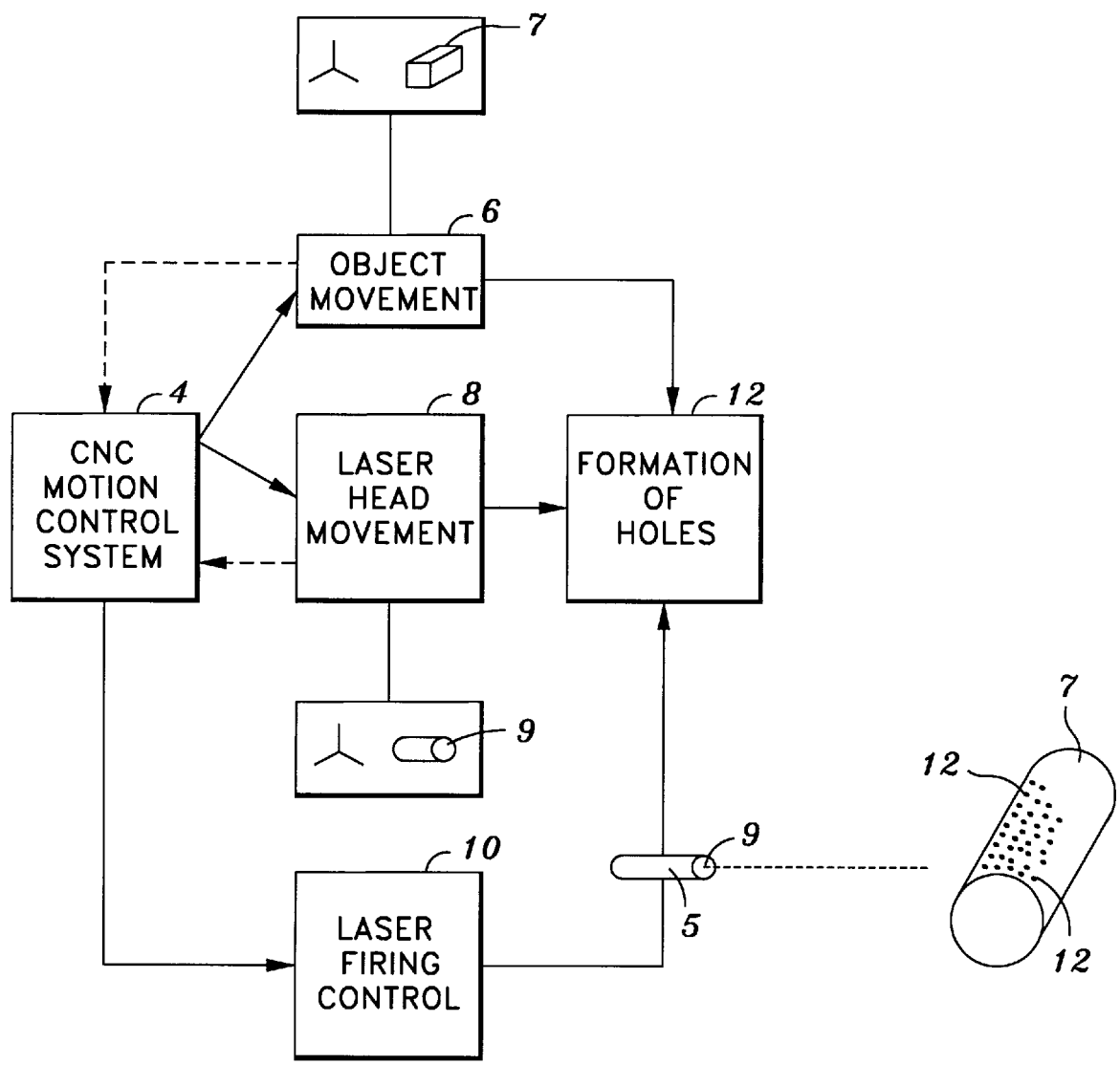
FIG. 1 is a schematic drawing illustrating a method of perforation according to the prior art.

FIG. 1 shows schematically a typical "firing on the fly" method of perforating an object according to the prior art. The method typically uses a laser 5 having a moveable head 9 to alter the laser beam trajectory to different areas on the surface of an object 7. Alternatively, the object 7 that is being perforated is moved with respect to a stationary laser beam 5 to form a plurality of holes 12. Still other designs contemplate using both a moveable laser head 9 and a moveable object 7 during the process.

The method employs a standard Computer Numerical Control ("CNC") system 4. The CNC system 4 controls either the movement 6 of the object 7 or the movement 8 of the laser head 9. The CNC system 4 is connected to a laser firing control unit 10. The laser firing control 10 signals the laser 5 or other source of high energy radiation, i.e., an electron beam, to fire. In the method illustrated in FIG. 1, the laser 5 is pulsed at uniform, pre-determined time intervals in response to the laser firing control unit 10 to form a plurality of perforations or holes 12 in the surface of the object 7.

Unfortunately, this method of perforating an object 7 is sensitive to any variation in the velocity of the object 7 or the laser head 9. Moreover, minor fluctuations in the timing of the laser pulses from the laser firing control 10 can adversely affect the placement of the holes or perforations 12 on the object 7 at the desired locations. These deficiencies are particularly problematic during acceleration and deceleration of the object 7 and/or the laser head 9.

Figure 2:
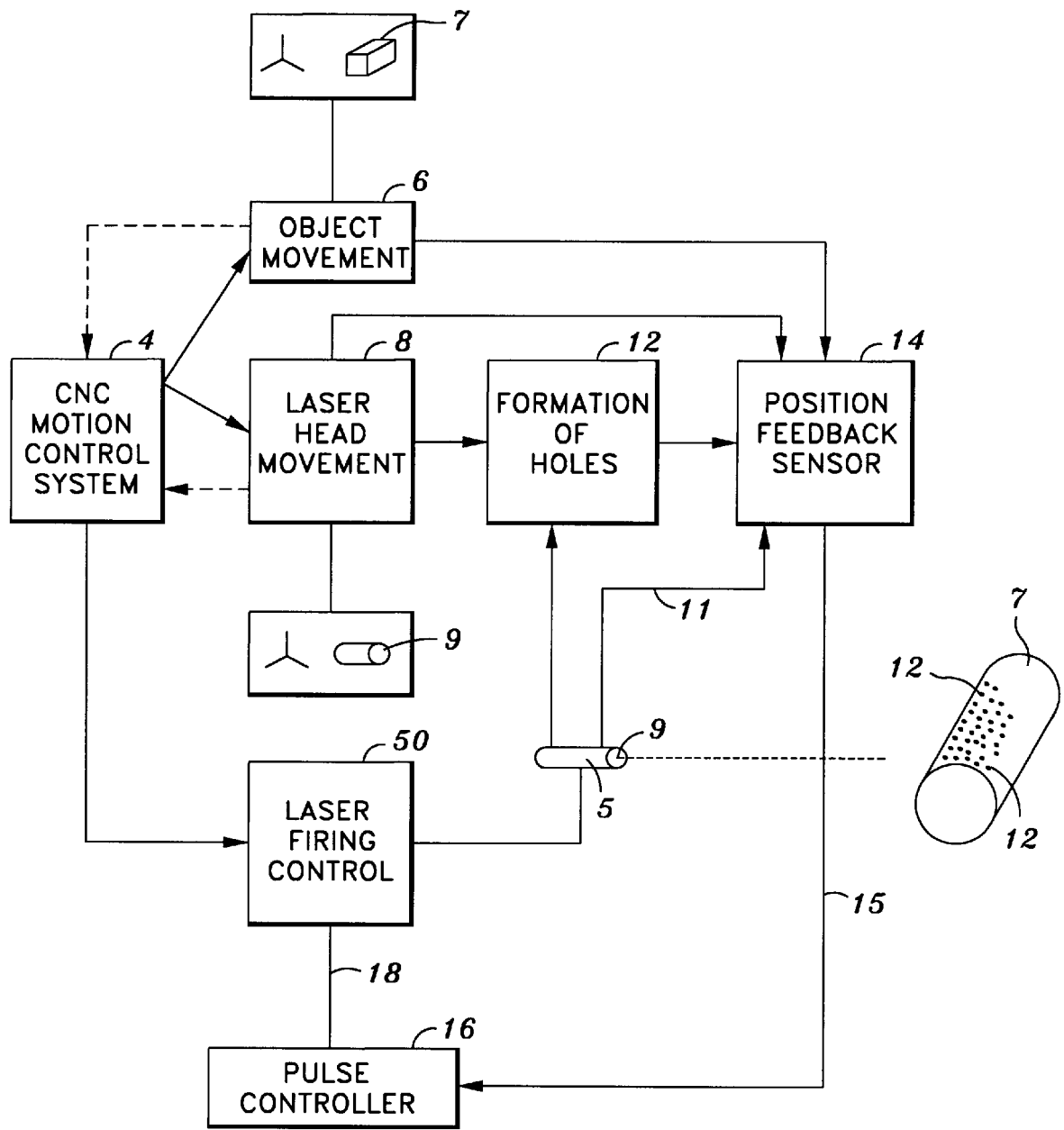
FIG. 2 is a schematic drawing illustrating the feedback mechanism according to one embodiment of the invention.

With reference now to FIG. 2, a method and apparatus according to a first preferred embodiment of the invention will now be described. The method and apparatus includes a CNC system 4 that controls the movement 6 of the object 7, the movement 8 of the laser head 9 or both movements at the same time or different times. (Alternatively, but not shown, two separate CNC systems could be used to perform the same functions.) The CNC system 4 is connected to a laser firing control unit 50. The present invention contemplates using a Nd:YAG laser (solid-state laser using yttrium aluminum garnet as the matrix material, doped with neodymium) as the preferred energy beam emitter or source. However, any alternative source of high-energy radiation capable of forming holes 12 in objects 7 can be used. Illustrative examples of alternative sources of high energy radiation include $CO_2$ lasers and electron beams.

Unlike the method illustrated in FIG. 1, the present embodiment includes a position feedback sensor 14 and a pulse controller 16. The position feedback sensor 14 and the pulse controller 16 determine the relative position of the object 7 to the laser head 9. The position feedback sensor 14 can be any number of motion position decoders. For example, the position feedback sensor 14 can be a rotary shaft encoder, a linear scale encoder, a laser measuring device, or any other type of encoder which provides a feedback control output signal 15 in response to a measured position.

Preferably, the position feedback sensor 14 can determine the precise location of either the object 7 or laser head 9 with extremely high resolution and accuracy. For example, position feedback sensors 14 with a resolution of at least around 0.0001 inches on the surface of the part are preferred. These include interpolation of the pulses through the pulse controller.

The pulse controller 16 is electrically connected to the position feedback sensor 14 and receives the feedback output control signal 15 from the position feedback sensor 14 in response to the relative positions of the object 7 and the laser head 9. The pulse controller 16 is preferably a computer, but it can be any type of logic device. During operation, the pulse controller 16 receives the feedback output control signal 15 from the position feedback sensor 14. The pulse controller 16 then calculates any variance in the position of the object 7 and/or the laser head 9 as a function of time from a predetermined schedule. In this regard, the exact position of the object 7 and/or the laser head 9 can be determined at any time along the run. Any differences between the desired position of the object 7 or the laser head 9 and their true positions can thus be compensated through the pulse controller 16. The pulse controller 16, in response to the feedback output control signal 15 from the position feedback sensor 14, sends a compensated signal 18 to the laser firing control 50 to fire the laser 5. The pulse controller 16 thus either speeds up or delays the time interval between pulses to accurately place the perforations or holes 12 in the object 7. In this regard, the pulsed energy beam can be fired at non-uniform time intervals. After each firing of the laser 5, the relative position of the object 7 and laser head 9 is altered either through movement of the laser head 9, movement of the object 7, or both.

The position feedback sensor 14, in addition to receiving signals relating to the object movement 6 and the laser head movement 8, also receives a firing signal 11 from the laser firing control 50. The firing signal 11 indicates the timing of the laser 5 firing as well as any dwell time that might exist in the system between the triggering of the laser firing and the actual firing of the laser 5. After passing through position feedback sensor 14, the firing signal 11 is passed through the pulse controller 16 where the timing of the next firing of the laser 5 can be altered, if need be. This is particularly advantageous as the feedback control mechanism makes immediate adjustments on a pulse by pulse basis not only for variations in the object movement 6 or laser head movement 8, but also for variations in the timing of the laser pulses.

This method enables precision drilling of a complex pattern of holes 12 in a variety of geometric objects 7, such as a helix pattern on the surface of a cylindrically shaped object 7. Moreover, this method produces precise interlaced rows of holes with no overlap between adjacent holes. Since there is no overlap between adjacent holes, the structural integrity of the web portion of the object 7 that resides between adjacent holes is maintained. This method also enables staggered rows of holes to be created in a non-planar object 7 in order to increase the density of holes while still maintaining a fixed distance between the hole centers.

Figure 3:
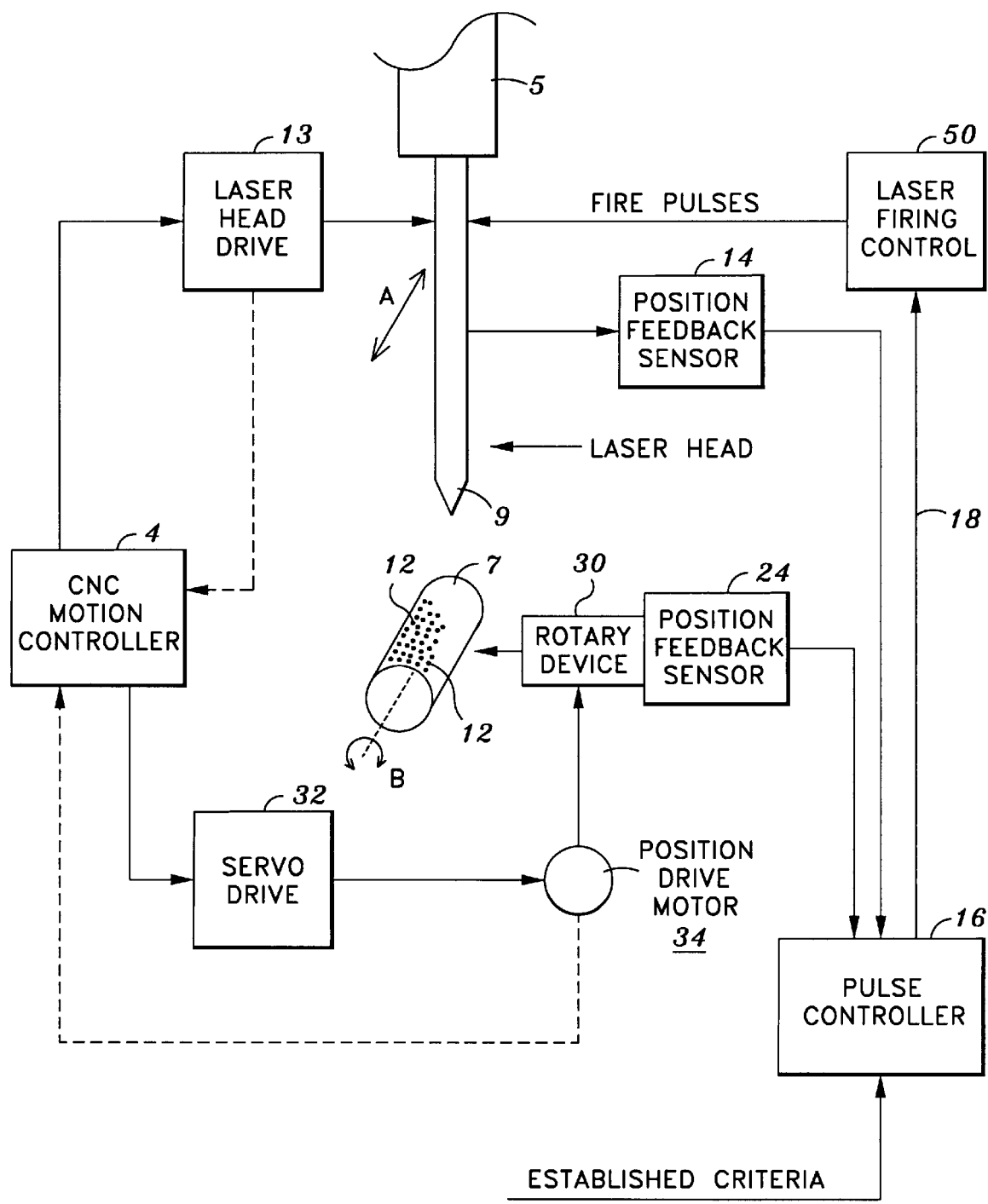
FIG. 3 is a schematic drawing illustrating the feedback mechanism according to a second embodiment of the invention.

With reference to FIG. 3, a description of another preferred method of forming perforations in an object will now be described. The method illustrated in FIG. 3 is one method of forming a complex pattern of holes 12 on the surface of a non-planar object 7. In this case, the non-planar object 7 is cylindrical in shape, and the pattern of holes is a helical pattern that extends around the circumference of the object 7.

Test runs were performed using the method of this embodiment, the results of which will now be described. A helical pattern of holes was drilled in an object 7. The object 7 used was a one inch diameter tube made out of titanium. The drilling resulted in holes 12 in the tube that had a diameter of about 0.0045 inches. The length of the drilled area was approximately 0.8 inches long with the lead of the helix being approximately 0.0084 inches. A hole spacing of about 0.0009 inches was obtained with about 31,000 holes being bored over the area. Tests using smaller hole diameters and hole spacing has produced a hole densities exceeding 50,000 holes per square inch.

Still referring to FIG. 3, a rotary mechanical device 30 securely holds an object 7 in position. While the object 7 is securely held, the object 7 is able to rotate about an axis through 360 degrees of arc. In this example, the object 7 is a cylindrical tube with structural ribs and a geometrically formed end cap (not shown). The rotary mechanical device 30 is rotated at a controlled velocity by a servo drive 32 and motor 34. The rotation rate of the object 7 is sensed and reported back to the CNC system 4. Variations in the rotational speed are compensated by the CNC system 4; however, minor variations continue to exist.

The laser 5 includes a laser head drive 13 that moves the laser head 9 in a linear fashion. The linear movement of the laser head 9 can be accomplished in a variety of ways, including linear track mounting or through the use of a gantry that permits movement of the laser head along the axis of the object 7. Variations in the velocity of the laser head 9 are sensed and reported back to the CNC system 4. Variations in the linear velocity are thus compensated by the CNC system 4. However, as with the rotation rate of the object 7, minor variations in the velocity of the laser head 9 continue to exist.

However, in addition to the CNC system 4, the current method includes a first position feedback sensor 14 and a second position feedback sensor 24. The first position feedback sensor 14 determines the actual or true position of the object 7 and/or laser head 9 in three dimensional space. For the laser head 9, the position feedback sensor consists of a linear scale. Preferably, a linear scale having a resolution of at least 0.0001 inches is used to determine the linear position of the laser head 9 at all times during the perforation process. A linear scale is preferred but is not required, as the required accuracy dictates the type of position feedback sensor 14 to be used. The second position feedback sensor 24 determines the actual or true position of the object 7 in three dimensional space. The rotary mechanical device 30 uses a rotary encoder to determine the exact position of the object 7 during rotation. Preferably the rotary encoder has a resolution of at least 0.001 inches on the surface of the object 7.

Signals are produced from each of position feedback sensors 14 and 24, and these signals are processed by pulse controller 16. As with the previous embodiment shown in FIG. 2, the processing of the pulse controller 16 may be accomplished through the use of any logic-type device such as a computer. The pulse controller 16 processes the data received from the feedback sensors 14 and 24 in response to a previously established set of criteria for drilling holes according to a preset pattern. Such instructions can be stored in any number of ways on the pulse controller 16 including, but not limited to, RAM, ROM, and in diskette form.

As in the previous embodiment, a Nd:YAG laser (solid-state laser using yttrium aluminum garnet as the matrix material, doped with neodymium) is used as the preferred energy beam emitter or source. However, once again, alternative sources of high energy radiation capable of forming holes 12 in objects 7 can be used.

The pulse controller 16 then transmits a compensated signal 18 to the laser firing control 50 to control the timing of the pulses of the energy beam, i.e., laser light. In addition, the pulse characteristics (such as pulse length) can also be controlled for each firing. The laser firing control 50 in turn fires the laser 5 in a precise location on the object 7 to form a hole 12. This process is repeated any number of times to produce a plurality of holes 12 in the object 7. In the embodiment as shown in FIG. 3, a helical pattern of holes 12 is created on the cylindrically shaped object 7. The laser head 9 moves in a lateral direction, in the direction of arrow A, along the axis of rotation of the object 7. At the same time, the object 7 is rotating about its axis in the direction of arrow B through the operation of the rotary mechanical device 30. When the laser 5 is fired repeatedly during the respective movement of the laser head 9 and the object 7, the resulting pattern of holes 12 is helical in nature.

As stated previously, the position feedback sensors 14 and 24 determine the actual position of the object 7 in relation to the laser head 9. Thus, any variations or errors that are introduced in the system from the CNC system 4 and servo loop 32 do not deleteriously affect the location of the drilled holes 12 on the surface of the object 7. Thus, a plurality of holes 12 can be drilled rapidly without having to repeatedly start and stop the movement of the laser head 9 and/or the object 7. In addition, the accurate determinations of the exact locations of the laser head 9 and the object 7 allows an operator to create hole patterns with extremely high densities without any overlap between adjacent holes.

For example, using a method of perforation as outlined above, hole densities within the range of about 10,000 holes/in$^2$ to about 32,000 holes/in$^2$ have been achieved at pulsing rates of within the range of about 10 holes/second to over 100 holes/second. Actual characteristics are a function of the power characteristics of the laser, and the pulsing rates achieved according to the present invention are only limited by such characteristics.

While preferred embodiments and applications of this invention have been shown and described, it would be apparent to those skilled in the art that many more modifications and substitutions of known equivalents are possible without departing from the scope and spirit of the invention. Accordingly, the invention is not intended to be restricted except as is required by the lawful scope of the following claims.

What is claimed is:

1. An improved method of forming a perforated non-planar object by use of a pulsed energy beam in which movement of an object relative to an energy beam emitter is controlled by a Computer Numerical Control ("CNC") motion controller, comprising the steps of:
    a) determining the relative position of the object to the pulsed energy beam;
    b) firing the pulsed energy beam at the object to form a hole based upon the relative position of the object to the pulsed energy beam in accordance with a preset hole pattern;
    c) altering the relative position of the object to the pulsed energy beam; and
    d) repeating steps a) through c) a plurality of times to form a perforated object with the preset hole pattern.

2. An improved method as recited in claim 1, wherein the pulsed energy beam is fired at a non-uniform time interval.

3. An improved method as recited in claim 1, wherein said method produces a hole density of at least 10,000 holes/in$^2$ when the energy beam pulses at a rate of at least 10 holes/sec.

4. An improved method as recited in claim 1, wherein said method produces a hole density of at least 20,000 holes/in$^2$ when the energy beam pulses at a rate of at least 10 holes/sec.

5. An improved method as recited in claim 1, wherein said method produces a hole density of at least 30,000 holes/in$^2$ when the energy beam pulses at a rate of at least 10 holes/sec.

6. An improved method as recited in claim 1, wherein said method produces a hole density of at least 10,000 holes/in$^2$ when the energy beam pulses at a rate of at least 50 holes/sec.

7. An improved method as recited in claim 1, wherein said method produces a hole density of at least 20,000 holes/in$^2$ when the energy beam pulses at a rate of at least 50 holes/sec.

8. An improved method as recited in claim 1, wherein said method produces a hole density of at least 30,000 holes/in$^2$ when the energy beam pulses at a rate of at least 50 holes/sec.

9. An improved method as recited in claim 1, wherein said energy beam is an ND:YAG laser.

10. An improved method as recited in claim 1, wherein said energy beam is a $CO_2$ laser.

11. An improved method as recited in claim 1, wherein the relative position of the object to the pulsed energy beam is altered by moving both the object and the pulsed energy beam.

12. An improved method as recited in claim 1, wherein the pulsed energy beam is fired at the object based upon the relative position of the object to the pulsed energy beam in accordance with the preset hole pattern and an established set of criteria.

* * * * *